UNITED STATES PATENT OFFICE.

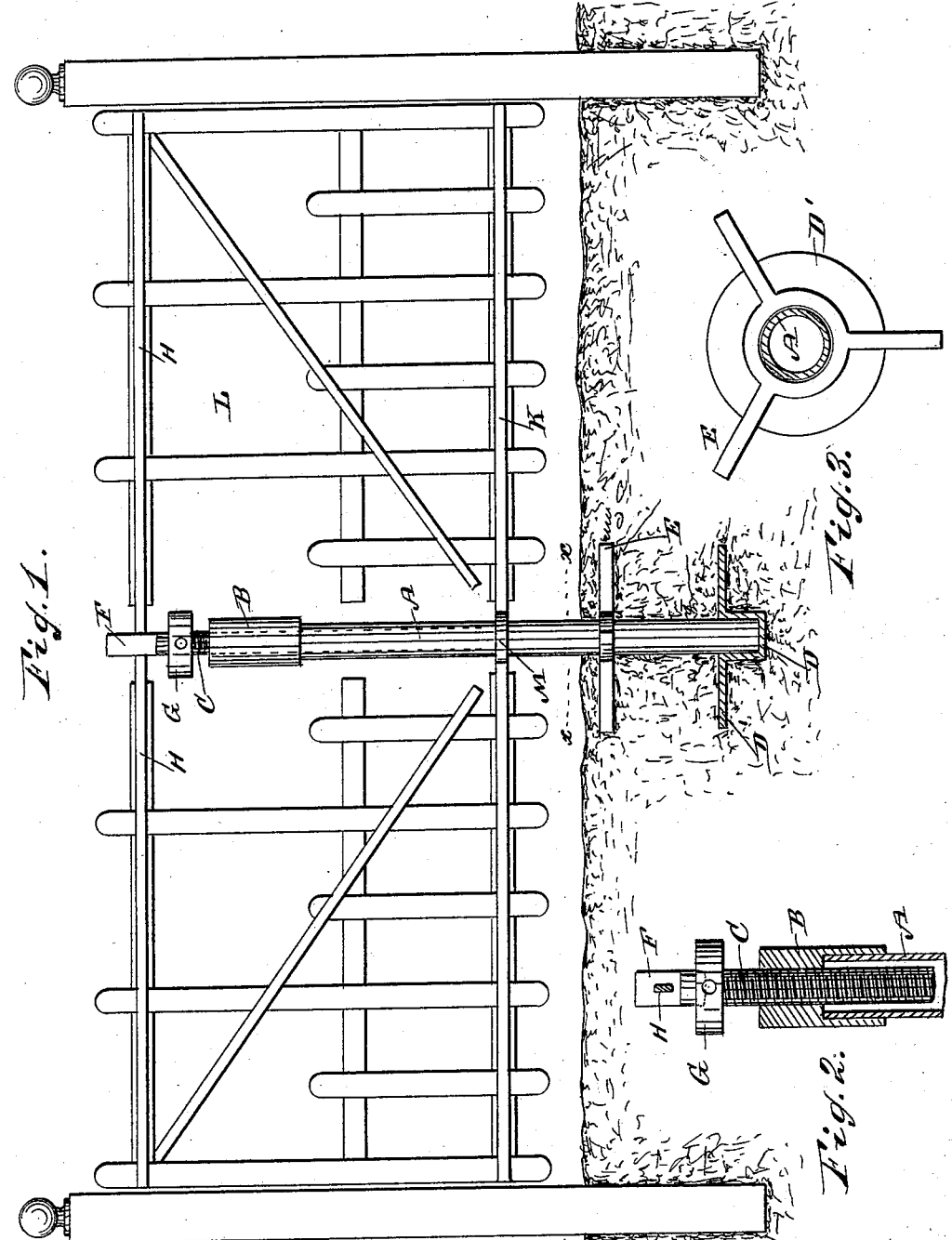

ISSACHAR CROWFOOT, OF HARTFORD, WISCONSIN.

GATE-HANGER.

SPECIFICATION forming part of Letters Patent No. 326,548, dated September 22, 1885.

Application filed July 19, 1884. (No model.)

*To all whom it may concern:*

Be it known that I, ISSACHAR CROWFOOT, of Hartford, in the county of Washington and State of Wisconsin, have invented a new and Improved Gate-Hanger, of which the following is a full, clear, and exact description.

The object of my invention is to provide a new and improved gate-hanging device, by means of which the gate can be turned on its vertical axis very easily.

The invention consists in the combination, with a gate-post, of a screw held in the post and supporting a block or head in which the top supporting-bar of the gate is held, whereby by turning the screw the gate can be raised or lowered at will. The lower end of the post rests in a flanged cup embedded in the ground a short distance below the surface, the post passing through a spider-frame.

Reference is to be had to the accompanying drawings, forming part of this specification, in which similar letters of reference indicate corresponding parts in all the figures.

Figure 1 is a longitudinal elevation of a gate provided with my improved hanging device. Fig. 2 is a longitudinal sectional view of the top of the tubular post. Fig. 3 is a sectional plan view on the line $x\ x$, Fig. 1.

On the upper end of an upright tubular post, A, a nut, B, is held in which a screw-spindle, C, is held to turn, the said spindle being provided at its upper end with a head, G, having apertures for receiving keys by means of which the head and spindle can be turned for the purpose of screwing the spindle up and down.

The lower end of the post is held in a cup, D, held in the ground, and provided with a horizontal flange, D'.

A short distance below the surface of the ground the tubular post A passes through a spider-frame, E, embedded in the ground. A head or block, F, provided with a pivot, is held to turn on the head G, and in the head or block F the top bar, H, is secured, to which top bar the top of the gate L is secured.

The bottom bar, K, to which the bottom of the gate is secured, is provided at or near its middle with an eye or ring, M, through which the post A passes.

The gate can be secured to the bars H K at both sides of the post A, and thus balance itself; or it can be balanced in any other suitable manner.

By turning the spindle up or down the gate is raised or lowered.

The gate swings or turns on the pivot of the head or block F.

Having thus described my invention, I claim as new and desire to secure by Letters Patent—

1. The combination, with a tubular post, of a screw held in the top of the post, a head adapted to turn on the top of the screw, and a gate connected with the head and adapted to turn with the same, substantially as herein shown and described.

2. The combination, with a tubular post, of a screw in the same, a head adapted to turn on the top of the screw, a bar in the head, which bar is connected with the top of the gate, and a bar connected with the bottom of the gate and provided with an eye through which the post passes freely, substantially as herein shown and described.

3. The combination, with the post A, of the nut B, the screw C, the head G, the head F, provided with a pivot, the gate L, the top bar, H, and the bottom bar, K, having an eye, M, substantially as herein shown and described.

ISSACHAR CROWFOOT.

Witnesses:
J. R. RICE,
GEO. GROH.